A. MIDDAUGH.
Milk-Testing Process.

No. 161,142

Patented March 23, 1875

WITNESSES:
Chas. Nida
A. F. Terry

INVENTOR:
A. Middaugh
BY
ATTORNEYS.

UNITED STATES PATENT OFFICE.

ALVIN MIDDAUGH, OF SCIO, NEW YORK.

IMPROVEMENT IN MILK-TESTING PROCESSES.

Specification forming part of Letters Patent No. 161,142, dated March 23, 1875; application filed December 12, 1874.

*To all whom it may concern:*

Figure 1:
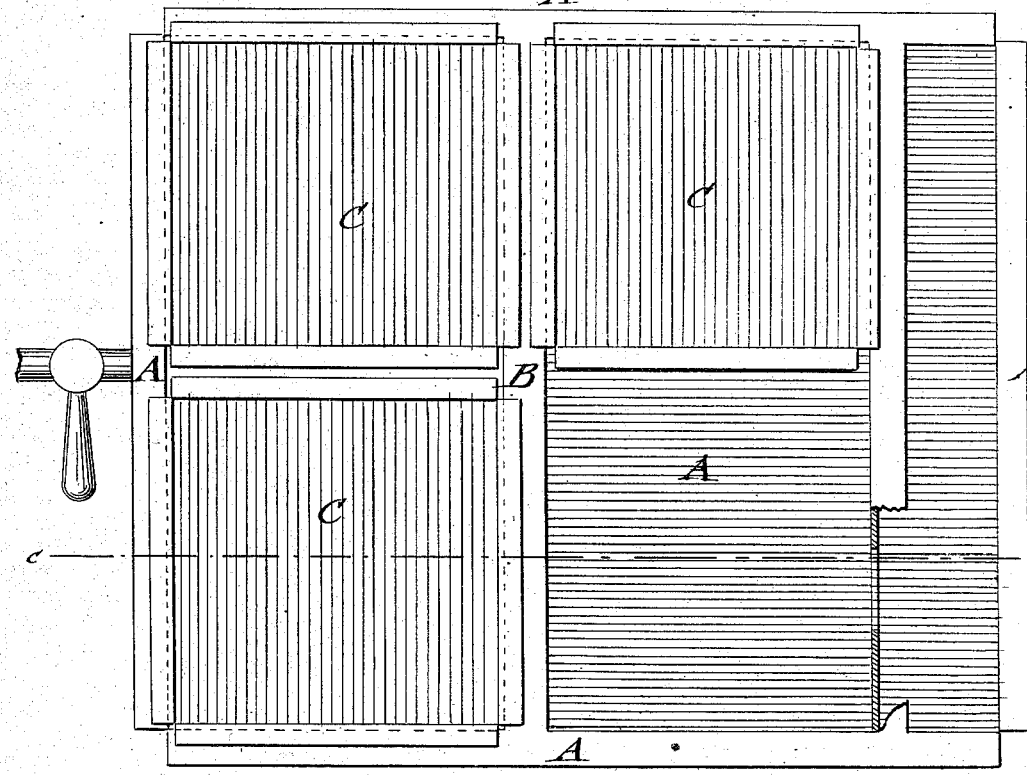
Figure 2:
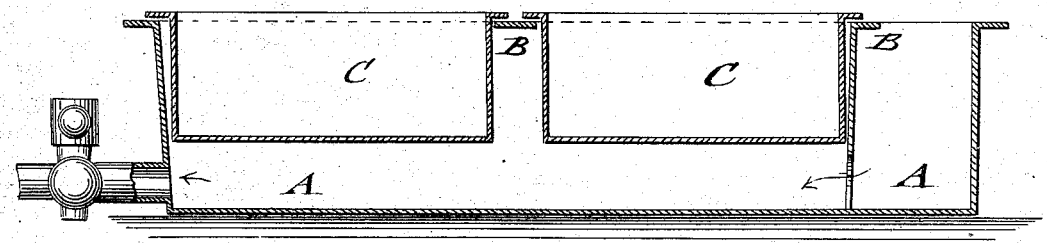

Be it known that I, A. MIDDAUGH, of Scio, Allegany county, in the State of New York, have invented a new Process of Testing Milk, to ascertain its impurities and the quantity of water which has been added thereto, of which the following is a specification:

Figure 1 is a plan, and Fig. 2 a sectional, view.

The invention relates to processes of testing milk, so that the impure may be rejected, and the pay for water may be deducted, by cheese-manufacturers.

I take a given quantity—say, one pound—of the milk supplied by each one of the numerous farmers who furnish it to the manufactory, and heat in a pan, C, with hot water or steam, in a receptacle, A B, until a temperature of about 90° Fahrenheit is obtained. This is found by practical experiment to develope the peculiar odor which characterizes any of the usual impurities. The distinctive smell of garlic, ordure, aged milk, putridity, fever, or disease of the udder, will each unmistakably manifest itself. If such manifestation takes place in any particular farmer's milk the same is rejected, being entirely unfit to make a wholesome and merchantable cheese. On the other hand, if only the natural odor of fresh milk is developed, there is no impurity, and the process is continued to ascertain the quantity of water or other liquid which may have been added. This is done by then applying to the heated milk some coagulator or curd-producer—such as rennet—and compressing the product until the whey has all exuded.

The standard weight of curd to a pound of milk will vary at different seasons of the year, and must, therefore, be ascertained at intervals, or the weight of whey in the same manner. The latter's excess over the standard will show unmistakably the addition of water. This is deducted proportionately from the aggregate of the farmer's milk, and his proper pay thus equitably adjusted.

By this process the manufacturer is then only compelled to pay for the genuine milk, and enabled to exclude entirely all that is unsuitable and unwholesome, while the public are caused to receive only pure, sweet, and healthy cheese.

What I claim as new is—

The process herein described of discovering impurities in milk, and the excess of water therein, by heating a given quantity of standard milk and a given quantity of each farmer's supply, to be tested, in separate vessels, to about 90° Fahrenheit, then coagulating the standard and samples, and finally compressing the undrained and unsalted curd, the specified heat thus developing the odors of the impurities, and the quantity of curd or whey indicating the water present, all substantially as hereinbefore specified.

ALVIN MIDDAUGH.

Witnesses:
PAUL GOEPEL,
T. B. MOSHER.